United States Patent
Miao et al.

(10) Patent No.: US 12,316,560 B2
(45) Date of Patent: May 27, 2025

(54) SRS TRANSMISSION METHOD AND APPARATUS, NETWORK DEVICE, TERMINAL AND STORAGE MEDIUM

(71) Applicant: DATANG MOBILE COMMUNICATIONS EQUIPMENT CO., LTD., Beijing (CN)

(72) Inventors: Deshan Miao, Beijing (CN); Qiuping Huang, Beijing (CN); Wen Tang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 472 days.

(21) Appl. No.: 17/774,869

(22) PCT Filed: Aug. 26, 2020

(86) PCT No.: PCT/CN2020/111414
§ 371 (c)(1),
(2) Date: May 6, 2022

(87) PCT Pub. No.: WO2021/088480
PCT Pub. Date: May 14, 2021

(65) Prior Publication Data
US 2022/0407650 A1  Dec. 22, 2022

(30) Foreign Application Priority Data
Nov. 6, 2019  (CN) .......................... 201911078524.1

(51) Int. Cl.
*H04L 5/00*  (2006.01)
(52) U.S. Cl.
CPC .................. *H04L 5/0048* (2013.01)
(58) Field of Classification Search
None
See application file for complete search history.

(56) References Cited

U.S. PATENT DOCUMENTS 10,819,484 B2 * 10/2020 Huang .............. H04W 72/0446
11,950,169 B2 *  4/2024 Keating .................. G01S 5/017
(Continued)

FOREIGN PATENT DOCUMENTS

CN          101572896 A       11/2009
CN          102427608 A        4/2012
(Continued)

OTHER PUBLICATIONS

ZTE et al.,"Discussion on SRS design for NR", 3GPP TSG RAN WG1 Meeting NR#3, Nagoya, Japan, Sep. 18-21, 2017, total 7 pages, R1-1715451.
(Continued)

*Primary Examiner* — Faiyazkhan Ghafoerkhan
(74) *Attorney, Agent, or Firm* — Kilpatrick Townsend & Stockton LLP

(57) ABSTRACT

Provided are a method and apparatus for transmitting a sounding reference signal (SRS), and a network device, a terminal. The method includes determining SRS configuration information on the basis of uplink related information corresponding to a terminal; issuing the SRS configuration information to the terminal; and receiving a SRS signal sent by the terminal on the basis of the SRS configuration information. By means of the method the network device, the terminal, SRS configuration information is determined on the basis of uplink-related information, and the dynamic configuration of SRS-related parameters is realized, and the related configuration of a SRS can better adapt to rapid changes in a Doppler frequency shift and a transmission delay caused by fast movement of a satellite, an uplink time-frequency estimation can resist fast-changing timing and frequency deviations, and the timeliness requirement of the uplink time-frequency estimation is satisfied.

11 Claims, 5 Drawing Sheets

(56) References Cited

U.S. PATENT DOCUMENTS

| | | | | |
|---|---|---|---|---|
| 2011/0058505 | A1* | 3/2011 | Pan | H04J 11/005 |
| | | | | 370/280 |
| 2013/0273878 | A1* | 10/2013 | Heo | H04L 5/0023 |
| | | | | 455/437 |
| 2015/0036666 | A1* | 2/2015 | Blankenship | H04W 56/0005 |
| | | | | 370/336 |
| 2017/0318574 | A1* | 11/2017 | Choi | H04L 5/0048 |
| 2019/0109689 | A1* | 4/2019 | Huang | H04L 5/0053 |
| 2019/0254061 | A1* | 8/2019 | Manolakos | H04L 5/0051 |
| 2020/0304262 | A1* | 9/2020 | Kim | H04W 4/70 |
| 2022/0210612 | A1* | 6/2022 | Keating | G01S 11/02 |
| 2022/0407650 | A1* | 12/2022 | Miao | H04L 5/0094 |

FOREIGN PATENT DOCUMENTS

| | | | |
|---|---|---|---|
| CN | 105981316 | A | 9/2016 |
| CN | 107370590 | A | 11/2017 |
| CN | 107431888 | A | 12/2017 |
| CN | 109921887 | A | 6/2019 |
| WO | 2010077041 | A2 | 7/2010 |
| WO | 2017197086 | A1 | 11/2017 |

OTHER PUBLICATIONS

European Patent Office, Extended European Search Report Issued in Application No. 20885153.5, Oct. 31, 2023, Germany, 9 pages.

* cited by examiner

SRS TRANSMISSION METHOD AND APPARATUS, NETWORK DEVICE, TERMINAL AND STORAGE MEDIUM

CROSS-REFERENCE TO RELATED APPLICATIONS

The present application is a US National Stage of International Application No. PCT/CN2020/111414, filed on Aug. 26, 2020, which claims priority to Chinese application No. 201911078524.1 filed on Nov. 6, 2019, entitled "SRS Transmission Method and Apparatus, Network Device, Terminal and Storage Medium", which are hereby incorporated by reference in their entireties.

FIELD

The present application relates to the field of wireless communication, and in particular, to a method and apparatus for transmitting a sounding reference signal (SRS), a network device, a terminal and storage medium.

BACKGROUND

In a current communication system, a network device usually corrects an uplink time frequency offset error based on a sounding reference signal (SRS) transmitted by a terminal.

In a satellite communication system, the propagation distance between a terminal and the satellite is also rapidly changing due to the rapid movement of a satellite, which causes rapid changes in Doppler shift and transmission delay. It is difficult for the terminal to compensate a deviation of timing information in real time with inaccurate positioning information or ephemeris information, which may result in a large uplink synchronization error. At present, the requirement of timely acquiring uplink timing and frequency deviation cannot be met only based on SRS.

SUMMARY

Embodiments of the application provide a method for transmitting a sounding reference signal (SRS) and apparatus, a network device, a terminal and a storage medium, which can solve the problem that traditional SRS is unable to meet the requirements of timely capturing uplink timing and frequency deviation.

According to a first aspect of an embodiment of the present application, provided is a method for transmitting a sounding reference signal (SRS), including:

determining SRS configuration information based on uplink related information corresponding to a terminal;

issuing the SRS configuration information to the terminal; and receiving a SRS signal transmitted by the terminal based on the SRS configuration information.

In one embodiment, the determining SRS configuration information based on uplink related information corresponding to a terminal includes:

determining SRS configuration parameters based on the uplink related information corresponding to the terminal, the uplink related information including a moving speed of the terminal and/or uplink information; and determining the SRS configuration information based on the SRS configuration parameters.

In one embodiment, in case that the uplink related information includes the moving speed of the terminal, the determining SRS configuration parameters based on uplink related information corresponding to a terminal includes:

determining SRS transmission interval parameters based on the moving speed of the terminal; the SRS transmission interval parameters including a SRS symbol interval and/or a SRS transmitting unit interval.

In one embodiment, the uplink information includes at least one of an uplink frequency offset, an uplink time delay or a signal-to-noise ratio;

in case that the uplink related information includes the uplink frequency offset, the determining SRS configuration parameters based on uplink related information corresponding to a terminal includes:

determining SRS transmission interval parameters based on the uplink frequency offset corresponding to the terminal; the SRS transmission interval parameters including a SRS symbol interval and/or a SRS transmitting unit interval;

in case that the uplink related information includes an uplink time delay, the determining SRS configuration parameters based on uplink related information corresponding to a terminal includes:

determining SRS subcarrier intervals based on change information of the uplink time delay corresponding to the terminal; and in case that the uplink related information includes the signal-to-noise ratio, the determining SRS configuration parameters based on uplink related information corresponding to a terminal includes:

determining a SRS repeated transmission parameter and/or the number of slots occupied by transmitting the SRS based on the signal-to-noise ratio corresponding to the terminal; the SRS repeated transmission parameter includes a repetition number of the SRS transmitting unit and/or a number of symbols continuously transmitted in the SRS transmitting unit.

In one embodiment, the SRS configuration information carries the SRS configuration parameters or identifiers corresponding to the SRS configuration parameters.

In one embodiment, the SRS configuration information includes a mapping relationship between SRS resources and physical uplink shared channel (PUSCH) resources.

The method further includes: after issuing the SRS configuration information to the terminal, issuing, to the terminal, a trigger instruction for triggering SRS and PUSCH combination transmission; the SRS and PUSCH combination transmission indicating that a SRS signal is transmitted firstly, and a PUSCH signal is transmitted subsequently; and receiving the SRS signal and the PUSCH signal sequentially transmitted by the terminal based on the trigger instruction.

In one embodiment, an interval exists between sequentially transmitted the SRS signal and PUSCH signal.

The receiving a SRS signal and a PUSCH signal sequentially transmitted by the terminal based on the trigger instruction includes:

receiving a SRS signal transmitted firstly by the terminal based on the trigger instruction, and adjusting a receiving timing and a frequency reference value of the PUSCH based on the received SRS signal; and receiving a PUSCH signal transmitted subsequently by the terminal based on the trigger instruction.

In one embodiment, the SRS configuration information is at least one of a radio resource control (RRC) signaling, a media access control (MAC) signaling or a downlink control information (DCI) signaling in which the RRC signaling is used for configuring the SRS signal, and the MAC signaling and the DCI signaling are used for triggering SRS signal transmission.

In one embodiment, the MAC signaling and the DCI signaling used for triggering the SRS signal transmission carry one or more of the following SRS parameter information:

the SRS symbol interval, the SRS transmitting unit interval, the repetition number of the SRS transmitting unit, the number of symbols continuously transmitted in the SRS transmitting unit, a subcarrier interval of SRS signal, and the number of slots occupied by transmitting the SRS.

According to a second aspect of an embodiment of the present application, provided is a method for transmitting a sounding reference signal (SRS), including:

receiving SRS configuration information issued by a network device; the SRS configuration information is determined by the network device based on uplink related information corresponding to a terminal; and transmitting a SRS signal to the network device based on the SRS configuration information.

In one embodiment, the SRS configuration information carries SRS configuration parameters or an identifiers corresponding to the SRS configuration parameters;

the transmitting a SRS signal to the network device based on the SRS configuration information includes:

determining the SRS configuration parameters based on the SRS configuration information; and transmitting a SRS signal to the network device based on the SRS configuration parameters.

In one embodiment, the SRS configuration parameters includes one or more of:

a SRS symbol interval, a SRS transmitting unit interval, a repetition number of a SRS transmitting unit, a number of symbols continuously transmitted in a SRS transmitting unit, a subcarrier interval of SRS signal, and a number of slots occupied by transmitting the SRS.

In one embodiment, the SRS configuration information includes a mapping relationship between SRS resources and PUSCH resources.

The method further includes: after receiving the SRS configuration information issued by the network device:

receiving a trigger instruction issued by the network device and used for triggering a SRS and PUSCH combination transmission; the SRS and PUSCH combination transmission indicates that a SRS signal is transmitted firstly, and then a PUSCH signal is transmitted; and sequentially transmitting the SRS signal and the PUSCH signal based on the trigger instruction.

In one embodiment, the sequentially transmitting the SRS signal and the PUSCH signal based on the trigger instruction includes:

transmitting the SRS signal based on the trigger instruction, and transmitting the PUSCH signal after a preset interval.

In one embodiment, the SRS configuration information is at least one of a radio resource control (RRC) signaling, a media access control (MAC) signaling or a downlink control information (DCI) signaling; the RRC signaling is used for configuring the SRS signal, and the MAC signaling and the DCI signaling are used for triggering the SRS signal transmission.

In one embodiment, the MAC signaling and the DCI signaling used for triggering the SRS signal transmission carry one or more of the following SRS parameter information:

the SRS symbol interval, the SRS transmitting unit interval, the repetition number of the SRS transmitting unit, the number of symbols continuously transmitted in the SRS transmitting unit, the subcarrier interval of SRS signal, and the number of slots occupied by transmitting the SRS.

According to a third aspect of an embodiment of the present application, provided is an apparatus for transmitting a sounding reference signal (SRS), including:

a configuration information determining unit configured to determine SRS configuration information based on uplink related information corresponding to a terminal;

a configuration information transmitting unit configured to issue the SRS configuration information to the terminal; and a SRS receiving unit configured to receive a SRS signal transmitted by the terminal based on the SRS configuration information.

According to a fourth aspect of an embodiment of the present application, provided is an apparatus for transmitting a sounding reference signal (SRS), including:

a configuration information receiving unit configured to receive SRS configuration information issued by a network device; the SRS configuration information is determined by the network device based on uplink related information corresponding to a terminal; and a SRS transmitting unit configured to transmit a SRS signal to the network device based on the SRS configuration information.

According to a fifth aspect of an embodiment of the present application, provided is a network device, including a memory, a processor, and a program stored in the memory and executable by the processor, where the program, when executed by the processor, causes the processor to implement the following steps of:

determining SRS configuration information based on uplink related information corresponding to a terminal;

issuing the SRS configuration information to the terminal; and receiving a SRS signal transmitted by the terminal based on the SRS configuration information.

According to a sixth aspect of an embodiment of the present application, provided is a terminal, including a memory, a processor, and a program stored in the memory and executable by the processor, where the program, when executed by the processor, causes the processor to implement the following steps of:

receiving SRS configuration information issued by a network device; the SRS configuration information is determined by the network device based on uplink related information corresponding to a terminal; and transmitting a SRS signal to the network device based on the SRS configuration information.

According to a seventh aspect of an embodiment of the present application, provided is a non-transitory computer readable storage medium, on which a computer program is stored, which computer program, when executed by a processor, implements the steps of the method according to the first or second aspect.

In the method and apparatus for transmitting a SRS, the network device, the terminal and the storage medium according to the embodiment of the application, the SRS configuration information is determined based on the uplink related information, and the dynamic configuration of the SRS related parameters is realized, and the SRS related configuration may better adapt to the rapid change of Doppler frequency shift and transmission delay caused by the rapid movement of a satellite, and therefore the uplink time-frequency estimation can resist against rapidly changing timing and frequency deviation, and the timeliness requirement of the uplink time-frequency estimation is met.

BRIEF DESCRIPTION OF THE DRAWINGS

In order to clearly illustrate the embodiments or implementations of the present application, the drawings used in the embodiments or implementations of the present application will be briefly described below, and the drawings in the following description are some embodiments of the present application.

DETAILED DESCRIPTION

To make the objects, implementations and advantages of the embodiments of the present application more clearly, the implementations in the embodiments of the present application will be described clearly and completely with reference to the drawings in the embodiments of the present application, and that the described embodiments are some, but not all embodiments of the present application.

In low earth orbit satellite communication systems, the velocity of the satellite is as high as 8 km/s, which results in that both the propagation distance between the terminal and the satellite and the Doppler shift vary rapidly. It is difficult for the terminal to compensate a deviation of timing information in real time in case of inaccurate positioning information or ephemeris information, which may result in a large error of uplink synchronization. In order to capture the timing and frequency offset of the uplink in time, a more robust method is needed to help the network device determine the timing and frequency offset.

Figure 1:
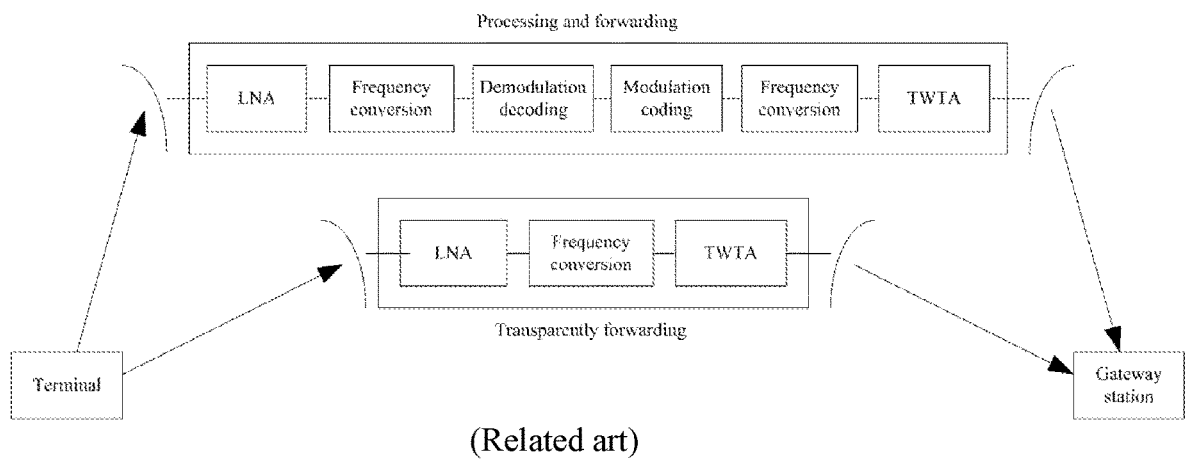
FIG. 1 is a schematic diagram of two operation modes of satellite communications in the related art.

FIG. 1 is a schematic diagram of two operation modes of satellite communication in the related art, as shown in FIG. 1, one operation mode is a bent-pipe mode, corresponding to a transparent forwarding labelled in the figure, the satellite only transparently forwards a signal without making any processing, and a terminal communicates with a gateway station; the other operation mode is regenerative communication, corresponding to the processing and forwarding labelled in the figure. In this case, the satellite can detect the information in the received signal, and perform the processing and forwarding to complete the function of the network device for connecting the terminal and the gateway station. In satellite communications, the connection between the terminal and the satellite is referred to as a user link and the connection between the satellite and the gateway station is a feeder link.

Figure 2:
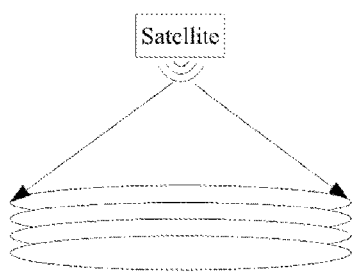
FIG. 2 is a diagram illustrating coverage of multiple satellite beams in the related art.
Figure 3:
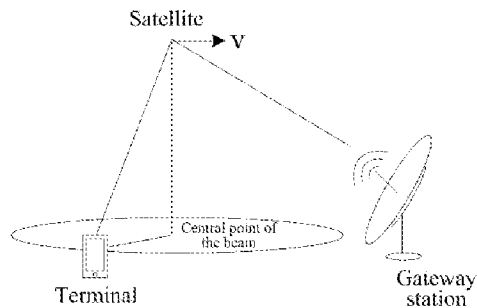
FIG. 3 is a schematic diagram of bent-pipe satellite communication Doppler and timing compensation in the related art.

In practical communications, a satellite often carries satellite beams, and FIG. 2 is a coverage diagram of the satellite beams of a satellite in the related art. For each satellite beam, the network device may perform Doppler compensation based on a central point of the beam. For example, when a downlink signal is transmitted, the network device first compensates a common part of a cell, and a remaining Doppler shift frequency is reduced, which is beneficial to performing frequency synchronization and tracking based on a synchronization signal by the terminal. When an uplink signal is transmitted, the terminal can also compensate the residual Doppler compensation, public uplink Doppler compensation is carried out by the network device, and the uplink Doppler frequency shift can also be completely compensated by the terminal when the terminal obtains the position information and the ephemeris information. For uplink timing, the distance between the terminal and the network device is constantly changing, and there are two timing compensation methods of which one is that the terminal performs all timing advance (TA) compensation, and the other is that the network compensates the common TA part, and the terminal only compensates the residual TA part. FIG. 3 is a schematic diagram of communication Doppler and timing compensation of a bent-pipe satellite in the related art, and as shown in FIG. 3, the central point of a beam is used as a reference point, and a terminal only compensates the remaining part of the relative reference point no matter Doppler compensation and TA compensation are performed, which is beneficial to reducing the complexity of the terminal.

In uplink timing compensation and Doppler compensation of a low-orbit satellite communication system, a great problem exists in that the satellite moves at a high speed, and the Doppler change rate can reach 8 khz/s, and the maximum change rate of the timing TA can reach 50 us/s. Meanwhile, the moving speed of the terminal has a large range, such as an airplane terminal with the speed of 1200 km/h and a fixed terminal with the speed of 0. These scenario settings may result in more complex parameters for satellite communication system design. In the conventional uplink synchronization design, depending on a physical random access channel (PRACH) signal and an uplink SRS signal, the PRACH signal is generally used for processing a large delay and frequency offset. For example, during initial access, the SRS signal is used for processing a small delay and frequency offset scenario and correcting an uplink time frequency offset error, and in this case, the terminal is already in an radio resource control (RRC) connection state.

In a traditional terrestrial 5G mobile communication system, the network can configure parameters related to SRS transmission, including a comb (frequency domain subcarrier interval number), a symbol number, SCS (subcarrier spacing), a repetition number, etc. However, these parameters cannot be dynamically changed, and cannot be adaptively adjusted based on the uplink timing and frequency deviation, and there are great defects in the satellite communication system.

Figure 4:
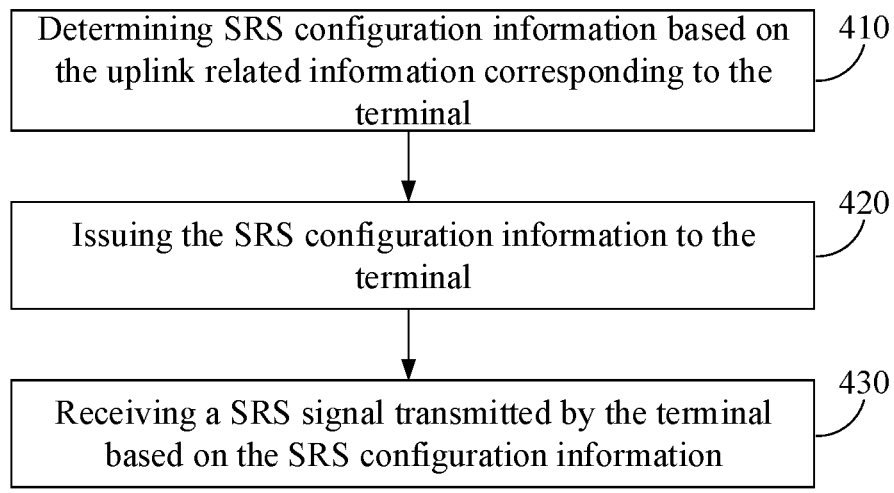
FIG. 4 is a schematic flowchart of a method for transmitting a sounding reference signal (SRS) according to an embodiment of the present application.

Therefore, according to an embodiment of the present application, provided is a method for transmitting SRS which may solve the problem of time frequency offset when a terminal is in an RRC connected state. FIG. 4 is a schematic flowchart of a method for transmitting a sounding reference signal (SRS) according to an embodiment of the present application, and as shown in FIG. 4, the method may be executed by a network device in a satellite communication system, for example, a base station, and the method includes:

step 410, determining SRS configuration information based on the uplink related information corresponding to the terminal.

Specifically, the terminal may be various user equipment with a wireless communication function under a satellite communication system, such as a handheld device, an in-vehicle device, a wearable device, and the like. The uplink related information corresponding to the terminal is information associated with an uplink state corresponding to the terminal, for example, a moving speed of the terminal itself, a frequency offset value, a time offset value, or a signal-to-noise ratio of the uplink, which are obtained by the network device through uplink measurement, and the like. The moving speed of the terminal may be obtained by the network through uplink signal estimation, or obtained by the terminal reporting.

The SRS configuration information is used to instruct the terminal to transmit related configuration parameters of the SRS signal, and the SRS configuration information may be only used for SRS related parameter configuration, or may trigger SRS signal transmission while instructing SRS related parameter configuration. Mapping relationship exists between the uplink related information and the related configuration parameters, and the corresponding related configuration parameters can be obtained based on the uplink related information corresponding to the terminal, and the SRS configuration information is obtained.

Step 420, issuing the SRS configuration information to the terminal.

Specifically, after the SRS configuration information is determined based on the uplink related information, it is transmitted to the terminal, and after receiving the SRS configuration information, the terminal can perform SRS related parameters configuration based on the SRS configuration information, and transmit the SRS signal to the network device when a transmitting period of a SRS signal is reached or a trigger signaling is received.

Step 430, receiving a SRS signal transmitted by the terminal based on the SRS configuration information.

Specifically, the network device receives a SRS signal transmitted by the terminal based on the SRS configuration information, and captures timing and frequency offset of an uplink in time based on the received SRS signal.

According to the method provided by the embodiment of the application, the SRS configuration information is determined based on the uplink related information, and the dynamic configuration of the SRS related parameters is realized, and the SRS related configuration can better adapt to the rapid change of Doppler frequency shift and transmission delay caused by the rapid movement of a satellite, and therefore the uplink time-frequency estimation can resist against rapidly changing timing and frequency deviation, and the timeliness requirement of the uplink time-frequency estimation is met.

Based on the foregoing embodiment, in the method, step 410 includes:

step 411, determining SRS configuration parameters based on uplink related information corresponding to the terminal; and the uplink related information includes a moving speed of the terminal and/or uplink information.

Further, the uplink information includes at least one of an uplink frequency offset, an uplink time delay, or a signal-to-noise ratio. The uplink frequency offset refers to a frequency offset estimation value of an uplink, the uplink time delay refers to a delay of the uplink, the signal-to-noise ratio refers to a signal-to-noise ratio of the uplink, and the link information may include any one or more of the above parameters, which is not limited in this embodiment of the present application.

SRS configuration parameters are parameters for SRS configuration, such as subcarrier interval, the number of symbols continuously generated by a transmitting unit, the number and interval of repetitions of different transmitting units, comb, sequence features, etc.

Any parameter in the uplink related information may be associated with one or more parameter settings in the SRS configuration parameters in advance, and the corresponding parameter in the SRS is dynamically adjusted through the detected change of any parameter in the uplink related information, and the rapid change of the Doppler shift and the transmission delay caused by the rapid movement of the satellite is better adapted.

Step 412, determining the SRS configuration information based on the SRS configuration parameters.

Specifically, after the SRS configuration parameters are dynamically adjusted, the corresponding SRS configuration information is determined based on the adjusted SRS configuration parameters, to instruct the terminal to perform the SRS configuration based on the SRS configuration parameters corresponding to the SRS configuration information.

Based on any of the foregoing embodiments, in the method, in case that the uplink related information includes the moving speed of the terminal, step 411 includes: determining SRS transmission interval parameters based on the moving speed of the terminal; the SRS transmission interval parameters include a SRS symbol interval and/or a SRS transmitting unit interval.

Specifically, the SRS symbol interval is an interval between two neighboring SRS symbols. Since the corresponding relation exists between the moving speed of the terminal and the uplink frequency deviation, and a corresponding relationship exists between the uplink frequency deviation and the SRS symbol interval, and the corresponding relationship between the moving speed of the terminal and the SRS symbol interval can be determined, and the corresponding SRS symbol interval can be further determined according to the moving speed of the terminal.

The SRS transmitting unit interval is an interval between two neighboring SRS transmitting units. Similarly, since a similar corresponding relationship exists between the moving speed of the terminal and the SRS transmitting unit interval. The size of the SRS transmitting unit interval may be adjusted correspondingly based on the size of the moving speed of the terminal.

Based on any of the foregoing embodiments, in the method, in case that the uplink related information includes an uplink frequency offset, step 411 includes: determining SRS transmission interval parameters based on uplink frequency offset corresponding to the terminal; the SRS transmission interval parameters include a SRS symbol interval and/or a SRS transmitting unit interval. The uplink frequency offset includes uplink Doppler shift, difference between an uplink receiving clock and a transmitting clock, or frequency shift caused by a device. In general, Doppler shift plays a dominant role in satellite communication systems.

Specifically, a corresponding relationship exists between the uplink frequency offset and the SRS symbol interval. For example, the inter-symbol phase offset $\phi=2\times pi\times delta\_f\times delta\_t$, where the interval between two neighboring SRS symbols is delta_t and the upstream frequency offset is delta_f. The inter-symbol phase error is obtained by performing correlation detection on two neighboring SRS symbols. Assuming that the interval delta_t of the SRS symbol has a fixed value, the smaller the uplink frequency offset delta_f is, the smaller the phase deviation $\phi$ is. In order to avoid the effect of too small phase deviation $\phi$ on the detection accuracy, the interval delta_t of the SRS symbol may be increased when the uplink frequency offset delta_f is smaller.

Figure 5:
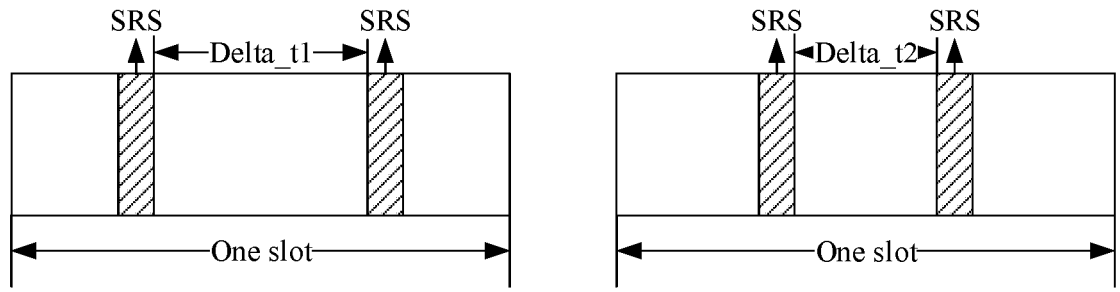
FIG. 5 is a schematic diagram of a SRS symbol interval according to an embodiment of the present application.

For example, FIG. 5 is a schematic diagram of SRS symbol intervals according to an embodiment of the present application, as shown in FIG. 5, a SRS symbol is a box filled with a diagonal line, an interval delta_t1 between two neighboring SRS symbol on the left side is equal to 6 symbols, an interval delta_t2 between two neighboring SRS symbol on the right side is equal to 4 symbols and an uplink frequency offset threshold is preset. If the uplink frequency offset is greater than the uplink frequency offset threshold, a smaller delta_t2 is selected as the SRS symbol interval, and if the uplink frequency offset is smaller than the uplink frequency offset threshold, a larger delta_t1 is selected as the SRS symbol interval.

Similarly, a similar corresponding relationship exists between the uplink frequency offset and the SRS transmitting unit interval. The size of the interval of the SRS transmitting unit may be adjusted correspondingly based on the size of the uplink frequency offset.

Based on any of the above embodiments, in the method, in case that the uplink related information includes an uplink time delay, step 411 includes: and determining the SRS subcarrier interval based on the change information of the uplink time delay corresponding to the terminal.

Specifically, in the design of a 5G system, the length of the cyclic prefix (CP) is related to the subcarrier interval, mainly because the boundaries of different subcarrier intervals are kept aligned. For example, in case that the subcarrier interval is 15 khz, the length of a corresponding slot is 1 ms, and in case that the subcarrier interval is 120 khz, the length of the corresponding slot is 0.125 ms, which is one in eight of 1 ms.

In the case of the short CP, the ability to resist delay is also weak. For example, when the subcarrier has an interval of 120 khz, the length of the CP is equal to 0.59 μs, which is smaller than its robust timing deviation of 0.3 μs. In order to improve the estimation capability of the uplink time delay offset, the CP needs to be enlarged, for example, the subcarrier interval is changed to 15 khz, and the corresponding CP length can reach 4.6 μs, in which case a larger timing offset can be resisted. The length of the CP is adjusted to improve the delay deviation resistance of the SRS signal, and the terminal can estimate the change value of the delay through the SRS signal and notify the terminal according to the change value, and the terminal can adjust the TA value of the uplink signal accordingly.

In a monitoring process of the uplink time delay, the change information of the uplink time delay, such as the increase or decrease of the uplink time delay, and the difference value of the increase or decrease of the uplink time delay, can be determined and obtained, and the subcarrier interval of the SRS can be dynamically adjusted based on the change information, and when the uplink time delay changes rapidly, the time delay estimation capability of the SRS can be improved to resist larger timing deviation.

Based on any of the above embodiments, in the method, in case that the uplink related information includes a signal-to-noise ratio, step 411 includes: determining a SRS repeated transmission parameter and/or the number of slots occupied by transmitting the SRS based on the signal-to-noise ratio corresponding to the terminal; the SRS repeated transmission parameter includes the repetition number of the SRS transmitting unit and/or the number of symbols continuously transmitted in the SRS transmitting unit.

Specifically, in case that the signal-to-noise ratio is low, the uplink diversity reception capability may be ensured by at least one of increasing a number of SRS symbols included in one SRS transmitting unit, increasing a number of SRS transmitting units that are repeatedly transmitted, and increasing a number of slots occupied by transmitting the SRS.

Figure 6:
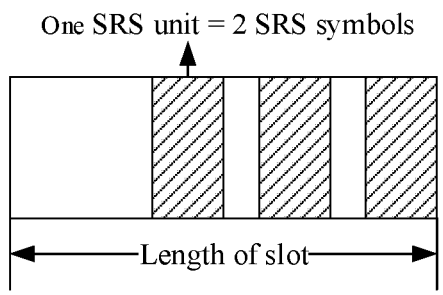
FIG. 6 is a schematic configuration diagram of a SRS repeated transmission parameter according to an embodiment of the present application.

FIG. 6 is a schematic configuration diagram of SRS retransmission parameters according to an embodiment of the present application, where a box filled with oblique lines in FIG. 6 is a SRS unit, multiple SRS units may be transmitted in a slot, and each SRS unit may include one or more SRS symbols, and the number of SRS symbol retransmission times can be adjusted by adjusting the repetition number of SRS transmitting units, the number of symbols continuously transmitted in the SRS transmitting unit, and the number of slots occupied by transmitting the SRS, and it is ensured that an uplink can also have better diversity reception capability when signal-to-noise ratio is low.

Based on any of the above embodiments, in the method, the SRS configuration information carries the SRS configuration parameters or an identifier corresponding to the SRS configuration parameters.

Specifically, the network device may explicitly or implicitly allow the terminal to configure the SRS through the SRS configuration information. Here, the SRS configuration information may directly carry the SRS configuration parameters, to explicitly transmit the SRS configuration parameters to the terminal, and the terminal performs SRS related parameter configuration. In addition, the SRS configuration information may also carry an identifier corresponding to the SRS configuration parameter, for example, a SRS type corresponding to the SRS configuration parameter, an ID of a SRS resource corresponding to the SRS configuration parameter, and the like, and the terminal is implicitly configured with the SRS.

For example, SRS resources may be set in advance, and different SRS resources correspond to different SRS configuration parameters. After the SRS configuration parameters corresponding to the terminal is determined based on the uplink information, the SRS resource corresponding to the terminal may be further determined, and an ID of the SRS resource is carried in the SRS configuration information and then transmitted to the terminal, and after receiving the SRS configuration information, the terminal may extract the ID of the SRS resource from the SRS configuration information, and call the corresponding SRS resource based on the ID to implement transmission of the SRS signal.

Another way is to define multiple SRS types and notify the terminal to transmit different SRS signals by type ID.

Based on any of the above embodiments, in the method, the SRS configuration information includes a mapping relationship between SRS resources and PUSCH resources.

Specifically, SRS resources and PUSCH resources may be preset and associated in advance to determine a mapping relationship between the SRS resources and the PUSCH resources.

The mapping relationship between the SRS resources and the PUSCH resources can be the corresponding relationship between a SRS resource identifier determined by any parameter such as the time-frequency position, the sequence, the subcarrier interval and the like of the SRS and a PUSCH resource, and when the PUSCH is informed to be sent, the terminal carries out the SRS and PUSCH combination transmission by scheduling the PUSCH transmission or triggering the SRS transmission.

In this case, the method further includes: after step 420, issuing, to the terminal, a trigger instruction for triggering SRS and PUSCH combination transmission, in which the SRS and PUSCH combination transmission indicates that a SRS signal is transmitted firstly and then a PUSCH signal is transmitted; and receiving the SRS signal and the PUSCH signal sequentially transmitted by the terminal based on the trigger instruction.

Specifically, when the terminal does not continuously generate a data signal, the network is lack of uplink synchronization information for the terminal, resulting in uplink timing or frequency offset, and therefore the terminal needs to transmit a SRS signal before transmitting the PUSCH to help the network obtain information of the uplink timing and frequency offset, to help the PUSCH demodulation.

Here, the trigger instruction is used to trigger SRS and PUSCH combination transmission, that is, to transmit a SRS signal before transmitting a PUSCH signal. The trigger instruction may include a PUSCH resource or an identifier corresponding to the PUSCH resource, and the terminal determines the PUSCH resource based on the trigger instruction, and determines the SRS resource based on a mapping relationship between the SRS resource and the PUSCH resource included in the SRS configuration information, to transmit the SRS signal based on the SRS resource, and transmit the PUSCH signal based on the PUSCH resource. In addition, the trigger instruction may further include a SRS resource or an identifier corresponding to the SRS resource, and the terminal determines the SRS resource based on the trigger instruction, and determines the PUSCH resource based on a mapping relationship between the SRS resource and the PUSCH resource included in the SRS configuration information, to transmit the SRS signal based on the SRS resource and transmit the PUSCH signal based on the PUSCH resource.

Figure 7:
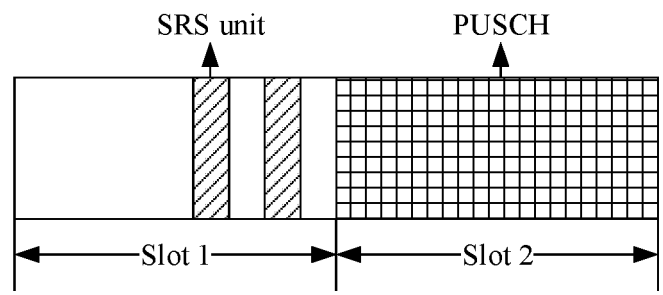
FIG. 7 is a schematic diagram of a combined SRS and PUSCH transmission according to an embodiment of the present application.

FIG. 7 is a schematic diagram of SRS and PUSCH combination transmission according to the embodiment of the present application, and as shown in FIG. 7, a SRS signal is transmitted twice before a PUSCH signal is transmitted, where each SRS signal is one SRS unit. Here, the network device may notify the terminal of the relevant features and configuration parameters of the SRS signal in advance, for example, the network device may transmit SRS configuration information to the terminal in advance.

The method provided by the embodiment of the application can help the network device to acquire the deviation information of timing and frequency before demodulating the PUSCH through combined transmission of the SRS and the PUSCH, and is helpful for demodulating the PUSCH.

Based on any of the above embodiments, in the method, an interval exists between sequentially transmitting SRS signal and PUSCH signal.

The interval is set to prevent interference between the SRS signal and the PUSCH signal, and the interval is preset, and may be one or more symbols or one or more slots, which is not limited in the embodiment of the present application.

In an embodiment, the receiving a SRS signal and a PUSCH signal which are sequentially transmitted by the terminal based on the trigger instruction includes: receiving the SRS signal transmitted firstly by the terminal based on the trigger instruction, adjusting a reception timing and the frequency reference value of the PUSCH based on the SRS signal; and receiving the PUSCH signal transmitted subsequently by the terminal based on the trigger instruction.

Specifically, when the terminal jointly transmits the SRS signal and the PUSCH signal, an interval is set between the SRS signal transmitted firstly and the PUSCH signal transmitted subsequently, and the network device can adjust the reception timing and the frequency reference value of the received PUSCH within a time corresponding to the interval after detecting the SRS signal, to demodulate the PUSCH signal received subsequently.

Based on any of the above embodiments, in the method, the SRS configuration information is at least one of a radio resource control (RRC) signaling, a media access control (MAC) signaling, or a downlink control information (DCI) signaling; the RRC signaling is used for configuring SRS signal, and the MAC signaling and the DCI signaling are used for triggering SRS signal transmission.

Specifically, for a periodic SRS signal, configuration may be performed through RRC signaling, and no triggering is required; for the semi-continuous SRS signal, the MAC signaling is used for triggering; for the aperiodic SRS signal, the DCI signaling is used for triggering.

For RRC signaling, it includes the following information:
1) basic parameters of SRS configuration: which include subcarrier interval, the number of symbols continuously transmitted in one SRS transmitting unit, the repetition times and intervals of different SRS transmitting units, comb, sequence characteristics and the like;
2) SRS resource and resource set configuration information: one resource set includes multiple SRS resources, and different SRS resources can allocate different users. One resource set, i.e. one resource pool, corresponds to one frequency band resource and to different SRS parameter sets.

For MAC signaling and DCI signaling, the following information is included:
the indication of the SRS configuration parameters includes a SRS symbol interval, a SRS transmitting unit interval, a repetition number of the SRS transmitting unit, a number of symbols continuously transmitted in the SRS transmitting unit, a subcarrier interval of SRS signal, and a number of slots occupied by transmitting the SRS and the like;
or, SRS type, where different type IDs correspond to different sets of SRS parameters;
or, a resource ID or resource set ID of the SRS.

Figure 8:
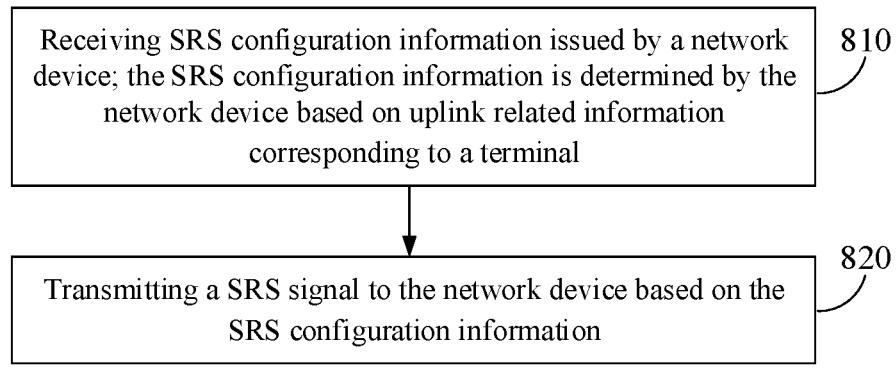
FIG. 8 is a flowchart illustrating a method for transmitting a sounding reference signal (SRS) according to another embodiment of the present application.

Based on any of the foregoing embodiments, FIG. 8 is a schematic flowchart of a method for transmitting a sounding reference signal (SRS) according to another embodiment of the present application, and as shown in FIG. 8, the method is executed by a terminal in a satellite communication system, where the method includes:

step 810, receiving SRS configuration information issued by a network device; the SRS configuration information is determined by the network device based on uplink related information corresponding to a terminal.

Specifically, the uplink related information corresponding to the terminal is information associated with an uplink state corresponding to the terminal, for example, a moving speed of the terminal itself, a frequency offset value, a time offset value, or a signal-to-noise ratio of the uplink obtained by the network device through uplink measurement, and the like, which is not limited in this embodiment of the application. The SRS configuration information is used to instruct the terminal to transmit the related configuration parameters of the SRS signal, and the SRS configuration information may be only used for SRS related parameter configuration, or may trigger SRS signal transmission while instructing SRS related parameter configuration.

The mapping relationship exists between the uplink related information and the related configuration parameters, the network device can obtain the corresponding related configuration parameters based on the uplink related information corresponding to the terminal, further obtain the SRS configuration information and transmit the SRS configuration information to the terminal, and then the terminal receives the SRS configuration information.

Step 820, transmitting a SRS signal to the network device based on the SRS configuration information.

Specifically, after the SRS configuration information is received, the SRS related parameter configuration is performed based on the SRS configuration information, and when a transmitting period of the SRS signal is reached or a trigger signaling is received, the SRS signal is transmitted to the network device, and the network device timely captures timing and frequency offset of an uplink based on the SRS signal.

According to the method provided by the embodiment of the application, the SRS configuration information is determined based on the uplink related information, and the dynamic configuration of the SRS related parameters is realized, and the SRS related configuration can better adapt to the rapid change of Doppler frequency shift and transmission delay caused by the rapid movement of a satellite, and therefore the uplink time-frequency estimation can resist against rapidly changing timing and frequency deviation, and the timeliness requirement of the uplink time-frequency estimation is met.

Based on any of the above embodiments, in the method, the SRS configuration information carries a SRS configuration parameter, or an identifier corresponding to the SRS configuration parameter;

correspondingly, step 820 includes:

step 821, determining SRS configuration parameters based on the SRS configuration information.

Specifically, the SRS configuration parameters are parameters used for SRS configuration, and the SRS configuration information may directly carry the SRS configuration parameters, and the terminal can directly extract the SRS configuration parameters from the SRS configuration information. In addition, the SRS configuration information may also carry an identifier corresponding to the SRS configuration parameter, for example, a SRS type corresponding to the SRS configuration parameter, an ID of a SRS resource corresponding to the SRS configuration parameter, and the like, and the terminal can indirectly determine the SRS configuration parameters based on the SRS configuration information.

Step 822, transmitting a SRS signal to the network device based on the SRS configuration parameters.

Specifically, after the SRS configuration parameters is determined, SRS configuration is performed based on the SRS configuration parameter, and when the SRS signal transmission period is reached or a trigger signaling is received, the SRS signal is transmitted to the network device.

Based on any of the above embodiments, the SRS configuration parameters includes one or more of: a SRS symbol interval, a SRS transmitting unit interval, a repetition number of the SRS transmitting unit, a number of symbols continuously transmitted in the SRS transmitting unit, subcarrier interval of SRS signal, and number of slots occupied by transmitting the SRS.

The SRS symbol interval and the SRS transmitting unit interval can be dynamically adjusted based on the moving speed or the uplink frequency offset of the terminal; the subcarrier interval of the SRS signal can be dynamically adjusted based on the change information of the uplink time delay corresponding to the terminal; the repetition number of the SRS transmitting unit, the number of symbols continuously transmitted in the SRS transmitting unit, and the number of slots occupied by transmitting the SRS may be dynamically adjusted based on the signal-to-noise ratio of the uplink corresponding to the terminal.

Based on any of the above embodiments, the SRS configuration information includes a mapping relationship between SRS resources and PUSCH resources.

Specifically, SRS resources and PUSCH resources may be preset and associated in advance to determine a mapping relationship between the SRS resources and the PUSCH resources.

Correspondingly, the method further includes: after step 810, receiving a trigger instruction which is issued by network device and used for triggering SRS and PUSCH combination transmission, and the SRS and PUSCH combination transmission indicates that a SRS signal is transmitted firstly and then a PUSCH signal is transmitted; and sequentially transmitting the SRS signal and the PUSCH signal based on the trigger instruction.

Specifically, the trigger instruction is used for triggering SRS and PUSCH combination transmission, that is, a SRS signal is transmitted in advance before a PUSCH signal is transmitted. The trigger instruction may include a PUSCH resource or an identifier corresponding to the PUSCH resource, and the terminal may determine the PUSCH resource based on the trigger instruction, and determine the SRS resource based on a mapping relationship between the SRS resource and the PUSCH resource included in the SRS configuration information, to transmit the SRS signal based on the SRS resource, and transmit the PUSCH signal based on the PUSCH resource. In addition, the trigger instruction may further include a SRS resource or an identifier corresponding to the SRS resource, and the terminal may determine the SRS resource based on the trigger instruction, and determine the PUSCH resource based on a mapping relationship between the SRS resource and the PUSCH resource included in the SRS configuration information, to transmit the SRS signal based on the SRS resource and transmit the PUSCH signal based on the PUSCH resource.

The method provided by the embodiment of the application can help the network device to acquire the deviation information of timing and frequency before demodulating the PUSCH through combined transmission of the SRS and the PUSCH, and is helpful for demodulating the PUSCH.

Based on any of the above embodiments, the sequentially transmitting, based on the trigger instruction, the SRS signal and the PUSCH signal includes: transmitting the SRS signal based on the trigger instruction, and transmitting a PUSCH signal after a preset interval.

Here, the preset interval is a preset interval, and is intended to prevent interference between a SRS signal and a PUSCH signal, and the preset interval may be one or more symbols or one or more slots, which is not limited in this embodiment of the present application.

When the SRS signal and the PUSCH signal are jointly transmitted, an interval is set between the SRS signal transmitted firstly and the PUSCH signal transmitted subsequently, and the network device can adjust the reception timing and the frequency reference value of the PUSCH within the time corresponding to the preset interval after detecting the SRS signal, to demodulate the PUSCH signal received subsequently.

Based on any of the above embodiments, the SRS configuration information is at least one of a radio resource control (RRC) signaling, a media access control (MAC) signaling, or a downlink control information (DCI) signaling; the RRC signaling is used for configuring SRS signal, and the MAC signaling and the DCI signaling are used for triggering SRS signal transmission.

Based on any of the above embodiments, the MAC signaling and the DCI signaling used to trigger SRS signal transmission carry one or more of the following SRS parameter information:

a SRS symbol interval, a SRS transmitting unit interval, a repetition number of the SRS transmitting unit, number of symbols continuously transmitted in the SRS transmitting unit, a subcarrier interval of SRS signal, or a number of slots occupied by transmitting the SRS.

Based on any of the above embodiments, a method for transmitting the SRS includes the following steps:

determining, by the network device, the SRS configuration parameters based on at least one of the moving speed of the terminal, the uplink frequency offset corresponding to the terminal, the uplink time delay or the signal-to-noise ratio, and explicitly or implicitly including the SRS configuration parameters in the RRC configuration signaling or the MAC/DCI trigger signaling.

Here, the SRS configuration parameters includes at least one of the following parameters: a configurable number of symbols continuously transmitted within a SRS transmitting unit, a configurable symbol interval between transmitting units, a configurable subcarrier interval, and a configurable repetition number of the SRS transmitting unit.

The different sub-carrier SCSs of SRS are configured for different uplink time delays to obtain different cyclic prefix lengths, or different CP lengths are directly configured to resist different uplink time delay deviations and different intervals of SRS symbols are configured for terminals with different moving speeds to improve the frequency offset estimation capability of SRS signal. Different SRS continuous transmission symbol numbers are configured for terminals with different signal-to-noise ratios to resist different channel SNR conditions.

The terminal receives SRS configuration parameters transmitted explicitly or implicitly by the network device, performs SRS parameter configuration and transmits corresponding SRS signal according to the trigger signaling to help the network device estimate the frequency offset error.

The method provided by the embodiment of the disclosure can configure different SRSs according to the moving speeds of different users, has low cost and reasonable design, and meets the time-frequency synchronization required by multiple users in a cell and the requirement of quickly acquiring the time-frequency offset error of an uplink.

Based on any of the above embodiments, the method for transmitting a sounding reference signal (SRS) further includes: triggering, by the network device, the SRS and PUSCH combination transmission, in which the SRS signal is used for performing time-frequency estimation in advance, and a symbol or a slot interval can be configured between the SRS signal and the PUSCH signal to eliminate the interference of the SRS signal and the PUSCH signal or reserve a time-frequency adjustment processing interval of the network device.

Figure 9:
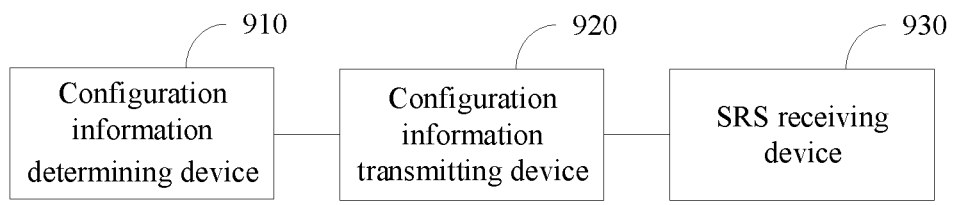
FIG. 9 is a schematic structural diagram of an apparatus for transmitting a sounding reference signal (SRS) according to an embodiment of the present application.

Based on any of the foregoing embodiments, FIG. 9 is a schematic structural diagram of an apparatus for transmitting a sounding reference signal (SRS) according to an embodiment of the present application, and as shown in FIG. 9, the apparatus for transmitting a sounding reference signal (SRS) includes a configuration information transmitting device 910, a configuration information transmitting device 920, and a SRS receiving device 930, in which, the configuration information transmitting device 910 is configured to determine SRS configuration information based on uplink related information corresponding to the terminal;

the configuration information transmitting device 920 is configured to issue the SRS configuration information to the terminal; and the SRS receiving device 930 is configured to receive a SRS signal transmitted by the terminal based on the SRS configuration information.

The apparatus for transmitting SRS according to the embodiment of the application determines the SRS configuration information based on the uplink related information, and realizes dynamic configuration of the SRS related parameters, and the SRS related configuration can better adapt to the rapid change of Doppler frequency shift and transmission delay caused by the rapid movement of a satellite, and therefore the uplink time-frequency estimation can resist against rapidly changing timing and frequency deviation, and the timeliness requirement of the uplink time-frequency estimation is met.

Based on any of the above embodiments, the configuration information transmitting device 910 includes:

a parameter determining subunit configured to determine the SRS configuration parameters based on the uplink related information corresponding to the terminal; and the uplink related information includes a moving speed of the terminal and/or uplink information; and an information determining subunit configured to determine the SRS configuration information based on SRS configuration parameters.

Based on any of the above embodiments, in case that the uplink related information includes the moving speed of the terminal, the parameter determining subunit is configured to:

determine SRS transmission interval parameters based on the moving speed of the terminal; the SRS transmission interval parameters include a SRS symbol interval and/or a SRS transmitting unit interval.

Based on any of the above embodiments, the uplink information includes at least one of an uplink frequency offset, an uplink time delay or a signal-to-noise ratio;

in case that the uplink related information includes an uplink frequency offset, the parameter determining subunit is configured to:

determine SRS transmission interval parameters based on uplink frequency offset corresponding to the terminal; the SRS transmission interval parameters include a SRS symbol interval and/or a SRS transmitting unit interval;

in case that the uplink related information includes an uplink time delay, the parameter determination subunit is configured to:

determine SRS subcarrier intervals based on the change information of the uplink time delay corresponding to the terminal; and in case that the uplink related information includes a signal-to-noise ratio, the parameter determining subunit is configured to:

determine a SRS repeated transmission parameter and/or the number of slots occupied by transmitting the SRS based on the signal-to-noise ratio corresponding to the terminal; the SRS repeated transmission parameter includes the repetition number of the SRS transmitting unit and/or the number of symbols continuously transmitted in the SRS transmitting unit.

Based on any of the above embodiments, the SRS configuration information carries the SRS configuration parameters or an identifier corresponding to the SRS configuration parameters.

Based on any of the above embodiments, the SRS configuration information includes a mapping relationship between SRS resources and PUSCH resources.

In an embodiment, the apparatus for transmitting SRS further includes:

a combined trigger transmitting unit configured to issue, to the terminal, a trigger instruction for triggering SRS and PUSCH combination transmission;

a combined signal receiving unit configured to receive a SRS signal and a PUSCH signal sequentially transmitted by the terminal based on the trigger instruction.

Based on any of the above embodiments, an interval exists between the sequentially transmitting SRS signal and PUSCH signal.

In an embodiment, the combined signal receiving unit is configured to:

receive a SRS signal transmitted by the terminal firstly based on the trigger instruction, and adjust the receiving timing and the frequency reference value of the PUSCH based on the SRS signal; and receive a PUSCH signal transmitted by the terminal subsequently based on the trigger instruction.

Based on any of the above embodiments, the SRS configuration information is at least one of a radio resource control (RRC) signaling, a media access control (MAC) signaling, or a downlink control information (DCI) signaling in which the RRC signaling is used for configuring the SRS signal, and the MAC signaling and the DCI signaling are used for triggering the SRS signal transmission.

Based on any of the above embodiments, the MAC signaling and the DCI signaling used for triggering SRS signal transmission carry one or more of the following SRS parameter information:

the SRS symbol interval, the SRS transmitting unit interval, the repetition number of the SRS transmitting unit, the number of symbols continuously transmitted in the SRS transmitting unit, subcarrier interval of SRS signal, and the number of slots occupied by transmitting the SRS.

Figure 10:
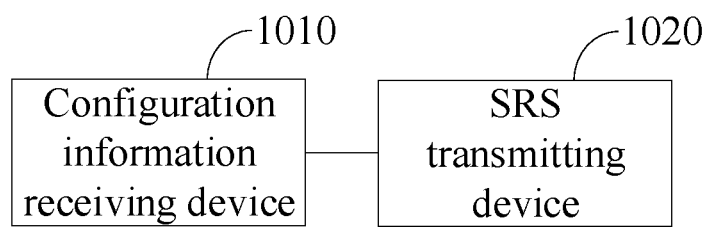
FIG. 10 is a schematic structural diagram of an apparatus for transmitting a sounding reference signal (SRS) according to another embodiment of the present application.

Based on any of the foregoing embodiments, FIG. 10 is a schematic structural diagram of an apparatus for transmitting a sounding reference signal (SRS) according to another embodiment of the present application, and as shown in FIG. 10, the apparatus for transmitting SRS includes a configuration information receiving device 1010 and a SRS transmitting device 1020;

the configuration information receiving device 1010 is configured to receive SRS configuration information issued by a network device; the SRS configuration information is determined by the network device based on uplink related information corresponding to a terminal; and the SRS transmitting device 1020 is configured to transmit a SRS signal to the network device based on the SRS configuration information.

The SRS transmission device provided by the embodiment of the application determines the SRS configuration information based on the uplink related information, and realizes dynamic configuration of the SRS related parameters, and the SRS related configuration can better adapt to the rapid change of Doppler frequency shift and transmission delay caused by the rapid movement of a satellite, and therefore the uplink time-frequency estimation can resist against rapidly changing timing and frequency deviation, and the timeliness requirement of the uplink time-frequency estimation is met.

Based on any of the above embodiments, the SRS configuration information carries a SRS configuration parameter or an identifier corresponding to the SRS configuration parameter.

In an embodiment, the SRS transmitting device 1020 is configured to:

determine the SRS configuration parameters based on the SRS configuration information; and transmit a SRS signal to the network device based on the SRS configuration parameters.

Based on any of the above embodiments, the SRS configuration parameters includes one or more of:

a SRS symbol interval, a SRS transmitting unit interval, a repetition number of the SRS transmitting unit, number of symbols continuously transmitted in the SRS transmitting unit, a subcarrier interval of SRS signal, and a number of slots occupied by transmitting the SRS.

Based on any of the above embodiments, the SRS configuration information includes a mapping relationship between SRS resources and PUSCH resources.

In an embodiment, the apparatus for transmitting SRS further includes:

a combined trigger receiving unit, configured to receive a trigger instruction issued by the network device and used for triggering a SRS and PUSCH combination transmission;

a combined signal transmitting unit configured to sequentially transmit a SRS signal and a PUSCH signal based on the trigger instruction.

Based on any of the embodiments, the combined signal transmitting unit is configured to:

transmit the SRS signal based on the trigger instruction, and transmit a PUSCH signal after a preset interval.

Based on any of the above embodiments, the SRS configuration information is at least one of a radio resource control (RRC) signaling, a media access control (MAC) signaling, or downlink control information (DCI) signaling; the RRC signaling is used for configuring the SRS signal, and the MAC signaling and the DCI signaling are used for triggering the SRS signal transmission.

Based on any of the above embodiments, the MAC signaling and the DCI signaling used for triggering SRS signal transmission carry one or more of the following SRS parameter information:

the SRS symbol interval, the SRS transmitting unit interval, the repetition number of the SRS transmitting unit, number of symbols continuously transmitted in the SRS transmitting unit, the subcarrier interval of SRS signal, and the number of slots occupied by transmitting the SRS.

Figure 11:
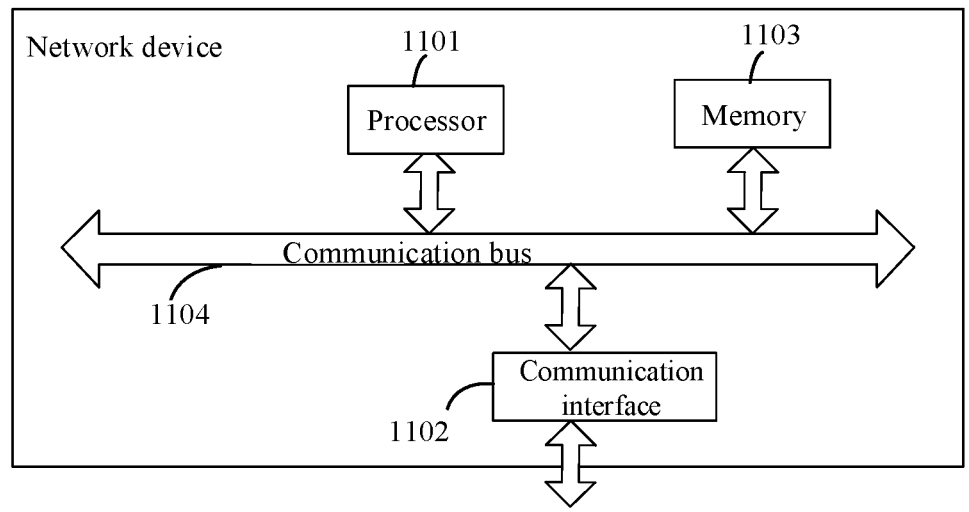
FIG. 11 is a schematic structural diagram of a network device according to an embodiment of the present application.

FIG. 11 is a schematic entity structure diagram of a network device according to an embodiment of the present application, and as shown in FIG. 11, the network device may include: a processor 1101, a communication interface 1102, a memory 1103, and a communication bus 1104. The processor 1101, the communication interface 1102 and the memory 1103 communicate with each other through a communication bus 1104. The processor 1101 may invoke a computer program stored in the memory 1103 and operable on the processor 1101 to perform the steps of:

determining SRS configuration information based on uplink related information corresponding to a terminal; issuing the SRS configuration information to the terminal; and receiving a SRS signal transmitted by the terminal based on the SRS configuration information.

In one embodiment, the determining SRS configuration information based on uplink related information corresponding to a terminal includes:

determining SRS configuration parameters based on uplink related information corresponding to the terminal; and the uplink related information includes the moving speed of the terminal and/or uplink information;

determining the SRS configuration information based on the SRS configuration parameters.

In one embodiment, in case that the uplink related information includes the moving speed of the terminal, the determining the SRS configuration parameters based on the uplink related information corresponding to the terminal includes:

determining SRS transmission interval parameters based on the moving speed of the terminal; the SRS transmission interval parameters include a SRS symbol interval and/or a SRS transmitting unit interval.

In one embodiment, the uplink information includes at least one of an uplink frequency offset, an uplink time delay or a signal-to-noise ratio;

in case that the uplink related information includes the uplink frequency offset, the determining SRS configuration parameters based on uplink related information corresponding to the terminal includes:

determining SRS transmission interval parameters based on the uplink frequency offset corresponding to the terminal; the SRS transmission interval parameters including a SRS symbol interval and/or a SRS transmitting unit interval;

in case that the uplink related information includes an uplink time delay, the determining SRS configuration parameters based on uplink related information corresponding to a terminal includes:

determining SRS subcarrier intervals based on change information of the uplink time delay corresponding to the terminal; and in case that the uplink related information includes a signal-to-noise ratio, the determining SRS configuration parameters based on uplink related information corresponding to a terminal includes:

determining a SRS repeated transmission parameter and/or the number of slots occupied by transmitting the SRS based on the signal-to-noise ratio corresponding to the terminal; the SRS repeated transmission parameter includes the repetition number of the SRS transmitting unit and/or the number of symbols continuously transmitted in the SRS transmitting unit.

In one embodiment, the SRS configuration information carries the SRS configuration parameters or identifiers corresponding to the SRS configuration parameters.

In one embodiment, the SRS configuration information includes a mapping relationship between SRS resources and physical uplink shared channel (PUSCH) resources;

the processor further performs the following steps when executing the program:

after the SRS configuration information is issued to the terminal, issuing, to the terminal, a trigger instruction for triggering SRS and PUSCH combination transmission; the SRS and PUSCH combination transmission indicates that a SRS signal is transmitted firstly, and then a PUSCH signal is transmitted; and receiving a SRS signal and a PUSCH signal sequentially transmitted by the terminal based on the trigger instruction.

In one embodiment, an interval exists between the sequentially transmitting SRS signal and PUSCH signal.

The receiving a SRS signal and a PUSCH signal sequentially transmitted by the terminal based on the trigger instruction includes:

receiving a SRS signal transmitted firstly by the terminal based on the trigger instruction, and adjusting the receiving timing and the frequency reference value of the PUSCH based on the SRS signal; and receiving a PUSCH signal transmitted subsequently by the terminal based on the trigger instruction.

In one embodiment, the SRS configuration information is at least one of a radio resource control (RRC) signaling, a media access control (MAC) signaling, or a downlink control information (DCI) signaling in which the RRC signaling is used for configuring the SRS signal, and the MAC signaling and the DCI signaling are used for triggering the SRS signal transmission.

In one embodiment, the MAC signaling and the DCI signaling used to trigger SRS signal transmission carry one or more of the following SRS parameter information:

the SRS symbol interval, the SRS transmitting unit interval, the repetition number of the SRS transmitting unit, the number of symbols continuously transmitted in the SRS transmitting unit, the subcarrier interval of SRS signal, and the number of slots occupied by transmitting the SRS.

It should be noted that the network device in this embodiment can implement all the method steps in the foregoing method embodiments and can achieve the same effects, and details of the same parts and the same effects in this embodiment as in the method embodiments are not described herein again.

In addition, the logic instructions in the memory 1103 can be implemented in the form of software functional units and stored in a computer readable storage medium when the logic instructions are sold or used as independent products. Accordingly, embodiments of the present application provide a computer software product, stored in a storage medium, including several instructions for causing a computer device (e.g., a personal computer, a server, or a network device, etc.) to perform all or part of the steps of the methods according to the various embodiments of the present application. The aforementioned storage medium includes: a U-disk, a removable hard disk, a Read-Only Memory (ROM), a Random Access Memory (RAM), a magnetic disk, or an optical disk, and various media to store program codes.

Figure 12:
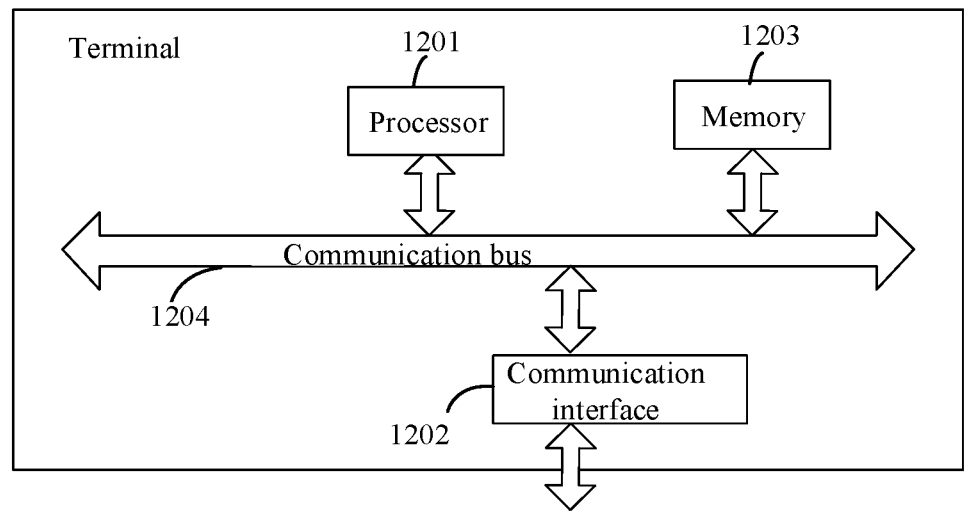
FIG. 12 is a schematic structural diagram of a terminal according to an embodiment of the present application.

FIG. 12 is a schematic entity structure diagram of a terminal according to an embodiment of the present application, and as shown in FIG. 12, the terminal may include: a processor 1201, a communication interface 1202, a memory 1203, and a communication bus 1204 in which the processor 1201, the communication interface 1202, and the memory 1203 communicate with each other through the communication bus 1204. The processor 1201 may invoke a computer program stored in the memory 1203 and operable on the processor 1201 to perform the steps of:

receiving SRS configuration information issued by a network device; the SRS configuration information is determined by the network device based on uplink related information corresponding to a terminal; and transmitting a SRS signal to the network device based on the SRS configuration information.

In one embodiment, the SRS configuration information carries a SRS configuration parameter or an identifier corresponding to the SRS configuration parameter;

the transmitting a SRS signal to the network device based on the SRS configuration information includes:

determining the SRS configuration parameters based on the SRS configuration information; and transmitting a SRS signal to the network device based on the SRS configuration parameters.

In one embodiment, the SRS configuration parameters include one or more of:

a SRS symbol interval, a SRS transmitting unit interval, a repetition number of the SRS transmitting unit, a number of symbols continuously transmitted in the SRS transmitting unit, a subcarrier interval of SRS signal, and a number of slots occupied by transmitting the SRS.

In one embodiment, the SRS configuration information includes a mapping relationship between SRS resources and PUSCH resources;

The processor further performs the following steps when executing the program:

after receiving the SRS configuration information issued by the network device, receiving a trigger instruction issued by the network device and used for triggering a SRS and PUSCH combination transmission; the SRS and PUSCH combination transmission indicates that a SRS signal is transmitted firstly, and then a PUSCH signal is transmitted; and sequentially transmitting the SRS signal and the PUSCH signal based on the trigger instruction.

In one embodiment, the sequentially sending, based on the trigger instruction, a SRS signal and a PUSCH signal includes:

transmitting the SRS signal based on the trigger instruction, and transmitting the PUSCH signal after a preset interval.

In one embodiment, the SRS configuration information is at least one of a radio resource control (RRC) signaling, a media access control (MAC) signaling, or a downlink control information (DCI) signaling; the RRC signaling is used for configuring the SRS signal, and the MAC signaling and the DCI signaling are used for triggering the SRS signal transmission.

In one embodiment, the MAC signaling and the DCI signaling used for triggering the SRS signal transmission carry one or more of the following SRS parameter information:

the SRS symbol interval, the SRS transmitting unit interval, the repetition number of the SRS transmitting unit, the number of symbols continuously transmitted in the SRS transmitting unit, the subcarrier interval of SRS signal, and the number of slots occupied by transmitting the SRS.

It should be noted that, the terminal in this embodiment can implement all the method steps in the foregoing method embodiments and can achieve the same effects, and details of the same parts and the same effects in this embodiment as in the method embodiments are not repeated herein.

In addition, the logic instructions in the memory 1203 may be implemented in a software functional unit, and may be stored in a computer readable storage medium when the logic instructions are sold or used as a stand-alone product. Thus, embodiments of the present application provide a computer software product, which is stored in a storage medium and includes several instructions for causing a computer device (which may be a personal computer, a server, or a network device) to perform all or part of the steps of the methods according to the embodiments of the present application. The aforementioned storage medium includes: a U-disk, a removable hard disk, a Read-Only Memory (ROM), a Random Access Memory (RAM), a magnetic disk, or an optical disk, and various media to store program codes.

The embodiments of the present application further provide a non-transitory computer-readable storage medium, on which a computer program is stored, where the computer program, when executed by a processor, implements the method for transmitting a sounding reference signal (SRS) provided in the foregoing embodiments, for example, the method includes: determining SRS configuration information based on uplink related information corresponding to a terminal; issuing the SRS configuration information to the terminal; and receiving a SRS signal transmitted by the terminal based on the SRS configuration information.

The embodiments of the present application further provide a non-transitory computer-readable storage medium, on which a computer program is stored, where the computer program, when executed by a processor, implements the method for transmitting a sounding reference signal (SRS) provided in the foregoing embodiments, for example, the method includes: receiving SRS configuration information issued by a network device; the SRS configuration information is determined by the network device based on uplink related information corresponding to a terminal; and transmitting a SRS signal to the network device based on the SRS configuration information.

The above-described embodiments of the apparatus are merely illustrative, and the units described as separate parts may or may not be physically separate, and parts displayed as units may or may not be physical units, may be located in one position, or may be distributed on multiple network units. Some or all of the modules may be selected according to actual needs to achieve the purpose of the solution of this embodiment.

Through the above description of the embodiments may be implemented by software plus a necessary general hardware platform, and may also be implemented by hardware. Thus, embodiments of the present application provide a computer software product, which may be stored in a computer-readable storage medium, such as ROM/RAM, magnetic disk, optical disk, etc., including instructions for causing a computer device (which may be a personal computer, server, or network device, etc.) to perform the methods described in the various embodiments or portions of embodiments.

What is claimed is:

1. A method for transmitting a sounding reference signal (SRS), comprising:
   determining SRS configuration information;
   issuing the SRS configuration information to a terminal; and
   receiving a SRS signal transmitted by the terminal based on the SRS configuration information,
   wherein the SRS configuration information carries SRS configuration parameters or identifiers corresponding to SRS configuration parameters, and the SRS configuration parameters comprise one or more of: a SRS symbol interval, a SRS transmitting unit interval, a repetition number of a SRS transmitting unit, a quantity of symbols continuously transmitted in a SRS transmitting unit, a subcarrier interval of SRS signal, or a quantity of slots occupied by transmitting a SRS.

2. The method of claim 1, wherein the SRS configuration information comprises a mapping relationship between SRS resources and physical uplink shared channel (PUSCH) resources, and
after issuing the SRS configuration information to the terminal, the method further comprises:
issuing, to the terminal, a trigger instruction for triggering SRS and PUSCH combination transmission, wherein the SRS and PUSCH combination transmission indicates that a SRS signal is transmitted firstly, and a PUSCH signal is transmitted subsequently; and
receiving the SRS signal and the PUSCH signal sequentially transmitted by the terminal based on the trigger instruction.

3. The method of claim 2, wherein an interval exists between sequentially transmitted SRS signal and PUSCH signal; and
the receiving the SRS signal and the PUSCH signal sequentially transmitted by the terminal based on the trigger instruction comprises:
receiving the SRS signal transmitted firstly by the terminal based on the trigger instruction, and adjusting receiving timing and a frequency reference value of the PUSCH based on the SRS signal; and
receiving the PUSCH signal transmitted subsequently by the terminal based on the trigger instruction.

4. The method of claim 1, wherein the SRS configuration information is at least one of a radio resource control (RRC) signaling, a media access control (MAC) signaling, or a downlink control information (DCI) signaling, and the RRC signaling is used for configuring the SRS signals, and the MAC signaling and the DCI signaling are used for triggering SRS signal transmission.

5. A method for transmitting a sounding reference signal (SRS), comprising:
receiving SRS configuration information issued by a network device; and
transmitting a SRS signal to the network device based on the SRS configuration information,
wherein the SRS configuration information carries SRS configuration parameters or identifiers corresponding to SRS configuration parameters, and the SRS configuration parameters comprise one or more of: a SRS symbol interval, a SRS transmitting unit interval, a repetition number of a SRS transmitting unit, a quantity of symbols continuously transmitted in a SRS transmitting unit, a subcarrier interval of SRS signal, or a quantity of slots occupied by transmitting a SRS.

6. The method of claim 5, wherein
the transmitting the SRS signal to the network device based on the SRS configuration information comprises:
determining the SRS configuration parameters based on the SRS configuration information; and
transmitting the SRS signal to the network device based on the SRS configuration parameters.

7. The method of claim 5, wherein the SRS configuration information comprises a mapping relationship between SRS resources and physical uplink shared channel (PUSCH) resources; and
after receiving the SRS configuration information issued by the network device, the method further comprises:
receiving a trigger instruction issued by the network device and used for triggering a SRS and PUSCH combination transmission, the SRS and PUSCH combination transmission indicating that a SRS signal is transmitted firstly, and a PUSCH signal is transmitted subsequently; and
sequentially transmitting the SRS signal and the PUSCH signal based on the trigger instruction.

8. The method of claim 7, wherein the sequentially transmitting the SRS signal and the PUSCH signal based on the trigger instruction comprises:
transmitting the SRS signal based on the trigger instruction, and transmitting the PUSCH signal after a preset interval.

9. The method of claim 5, wherein the SRS configuration information is at least one of a radio resource control (RRC) signaling, a media access control (MAC) signaling, or a downlink control information (DCI) signaling, and the RRC signaling is used for configuring the SRS signal, and the MAC signaling and the DCI signaling are used for triggering the SRS signal transmission.

10. A terminal comprising a memory, a processor and a program stored in the memory and executable by the processor, wherein the program, when executed by the processor, causes the processor to implement the following steps of claim 5.

11. A network device comprising a memory, a processor, and program stored in the memory and executable by the processor, wherein the program, when executed by the processor, causes the processor to implement the following steps of:
determining sounding reference signal (SRS) configuration information;
issuing the SRS configuration information to a terminal; and
receiving a SRS signal transmitted by the terminal based on the SRS configuration information,
wherein the SRS configuration information carries SRS configuration parameters or identifiers corresponding to SRS configuration parameters, and the SRS configuration parameters comprise one or more of: a SRS symbol interval, a SRS transmitting unit interval, a repetition number of a SRS transmitting unit, a quantity of symbols continuously transmitted in a SRS transmitting unit, a subcarrier interval of SRS signal, or a quantity of slots occupied by transmitting a SRS.

* * * * *